United States Patent
Okamoto

(10) Patent No.: US 11,934,050 B2
(45) Date of Patent: Mar. 19, 2024

(54) METHOD OF CONTROLLING OPTICAL MODULATOR, AND OPTICAL TRANSMITTER

(71) Applicant: SUMITOMO ELECTRIC INDUSTRIES, LTD., Osaka (JP)

(72) Inventor: Masaaki Okamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 221 days.

(21) Appl. No.: 17/651,438

(22) Filed: Feb. 17, 2022

(65) Prior Publication Data
US 2022/0269113 A1     Aug. 25, 2022

(30) Foreign Application Priority Data
Feb. 22, 2021 (JP) ................. 2021-026133

(51) Int. Cl.
G02F 1/01     (2006.01)
G02F 1/21     (2006.01)
H04B 10/516   (2013.01)

(52) U.S. Cl.
CPC ........... G02F 1/0123 (2013.01); G02F 1/212 (2021.01); H04B 10/516 (2013.01)

(58) Field of Classification Search
CPC ................ G02F 1/212; G02F 1/0123
See application file for complete search history.

(56) References Cited

U.S. PATENT DOCUMENTS

| 11,159,242 | B2* | 10/2021 | Kawakami | H04B 10/54 |
| 2010/0142964 | A1* | 6/2010 | Chang | H04B 10/50575 |
| | | | | 398/116 |
| 2017/0294967 | A1* | 10/2017 | Schmogrow | H04B 10/50575 |
| 2018/0267340 | A1* | 9/2018 | Rohde | G02F 1/225 |

FOREIGN PATENT DOCUMENTS

JP     2019-184844     10/2019

OTHER PUBLICATIONS

T. Yoshida, "Automatic Bias Control for Arbitrary Optical Signal Generation by Dual-Parallel MZM", Jul. 2010, OptoElectronics and Communications Conference, All Pages (Year: 2010).*

(Continued)

*Primary Examiner* — Pranesh K Barua
(74) *Attorney, Agent, or Firm* — IPUSA, PLLC

(57) ABSTRACT

A method of controlling an optical modulator having a first child modulator, a second child modulator, and a parent modulator includes applying a first bias, on which a first dither signal with frequency f1 is superimposed, to the first child modulator, applying a second bias, on which a second dither signal with frequency f2 different from f1 is superimposed, to the second child modulator, applying a third bias, on which a third dither signal with frequency f3 different from both f1 and f2 is superimposed, to the parent modulator. A first error component having the f1 frequency, and a second error component having a beat frequency of f2 and f3 frequencies are detected from the output light from the optical modulator, and a first error signal is generated from the first error component and the second error component to adjust the first bias.

14 Claims, 16 Drawing Sheets

(56) References Cited

OTHER PUBLICATIONS

Pak S. Cho et al. "Closed-Loop Bias Control of Optical Quadrature Modulator" IEEE Photonics Technology Letters, vol. 18, No. 21, Nov. 1, 2006.
Tsuyoshi Yoshida et al. "A Study on Automatic Bias Control for Arbitrary Optical Signal Generation by Dual-parallel Mach-Zehnder Modulator", ECOC 2010, Sep. 19-23, 2010 Tu. 3.A.6.
Hiroto Kawakami et al. "Auto bias control technique for optical 16-QAM transmitter with asymmetric bias dithering" Dec. 12, 2011, vol. 19, No. 26, Optics Express B308.
Mohammad Sotoodeh, et al. "Modulator Bias and Optical Power Control of Optical Complex E-Field Modulators," Journal of Lightqave Technology, vol. 29, No. 15, Aug. 1, 2011.

\* cited by examiner

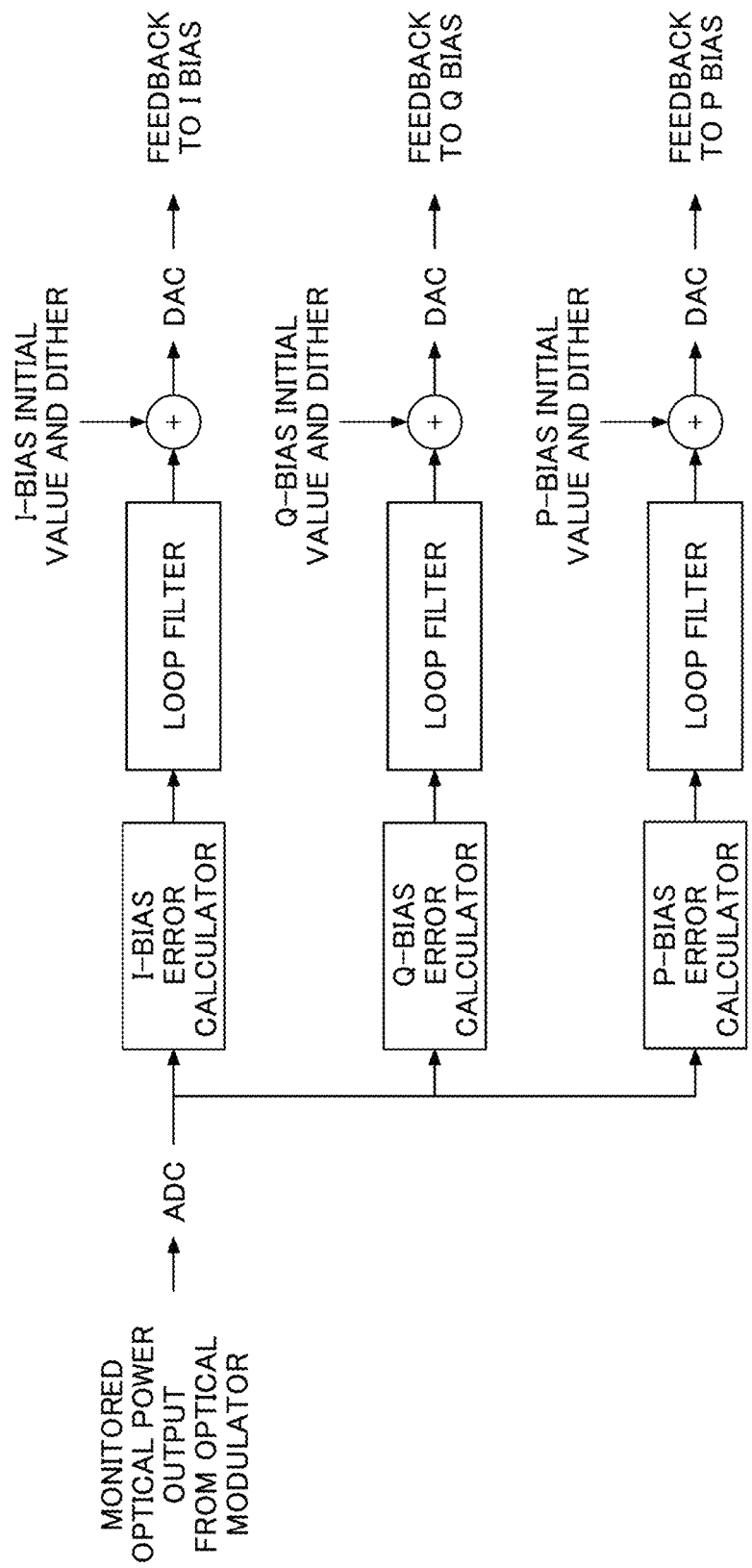

CHILD-MZM HIGHEST EXTINCTION

IQ OFFSET MINIMUM

AVERAGE POWER MINIMUM

FIG.6
(a) I-bias dither ($f_1$)
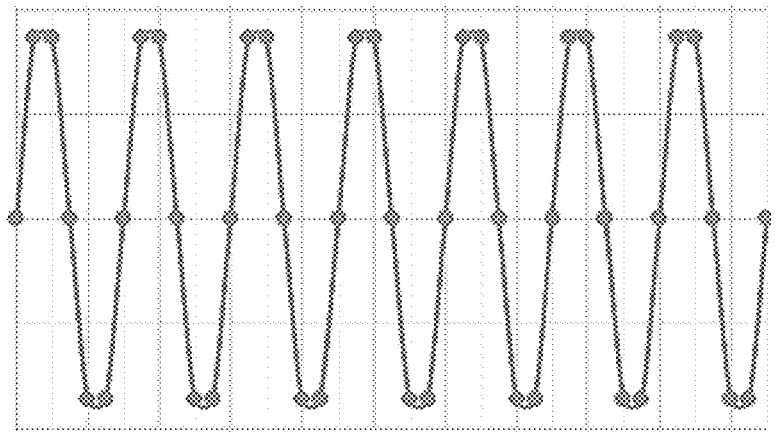
(b) Q-bias dither ($f_2$)
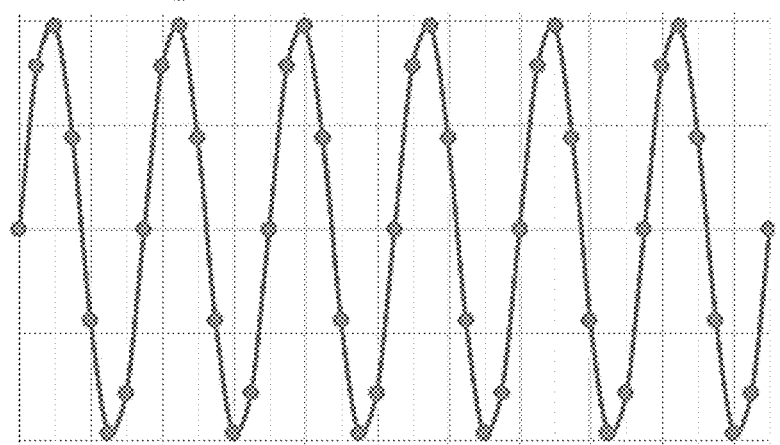
(c) P-bias dither ($f_3$)
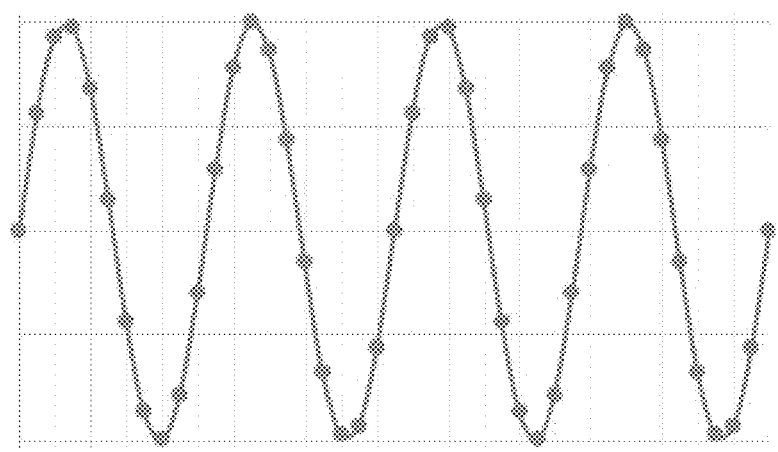

FIG.7
1st I-bias error detection (the same frequency as I-dither)
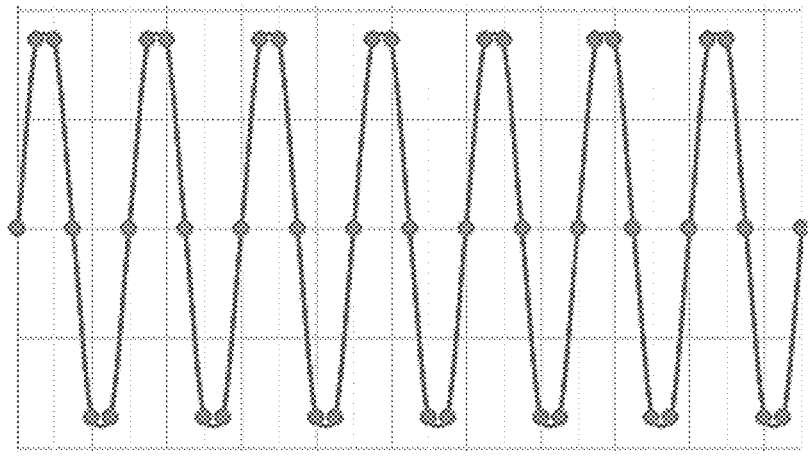
+
2nd I-bias error detection (Q-P beat frequency)
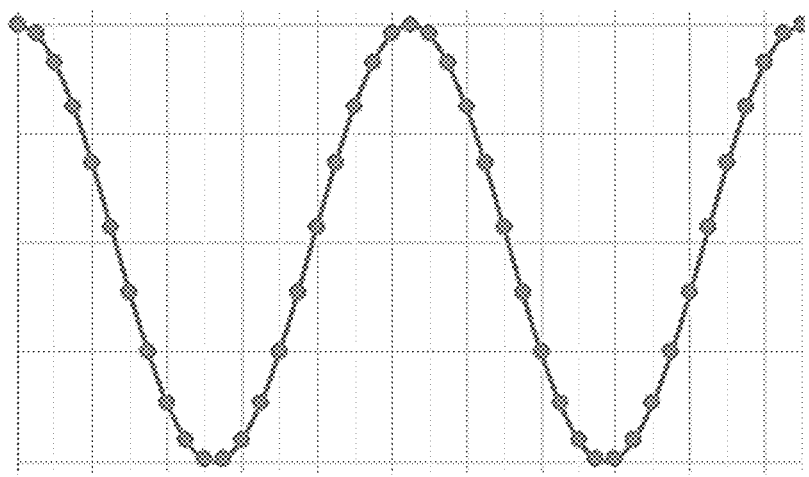

FIG.8
1st Q-bias error detection (the same frequency as Q-dither)
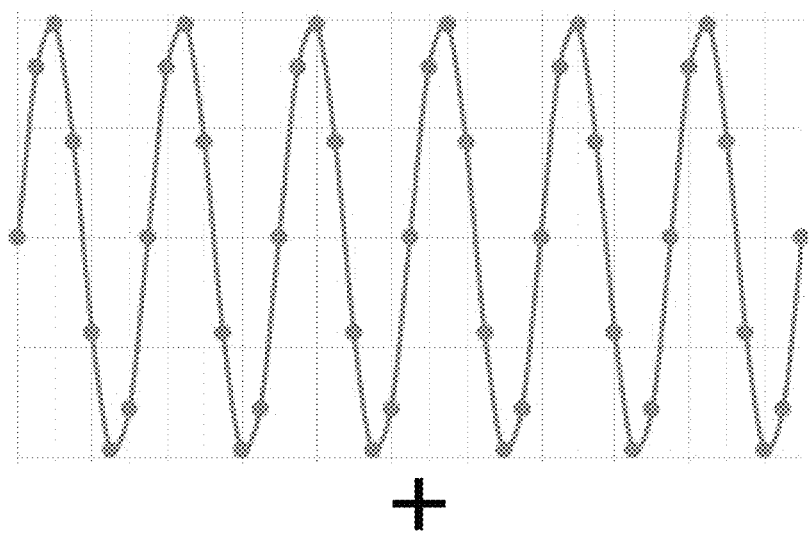
+
2nd Q-bias error detection (I-P beat frequency)
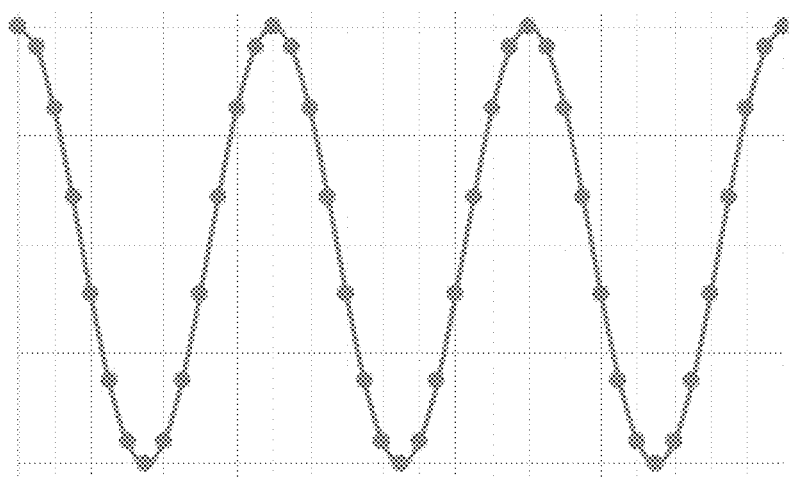

FIG.12
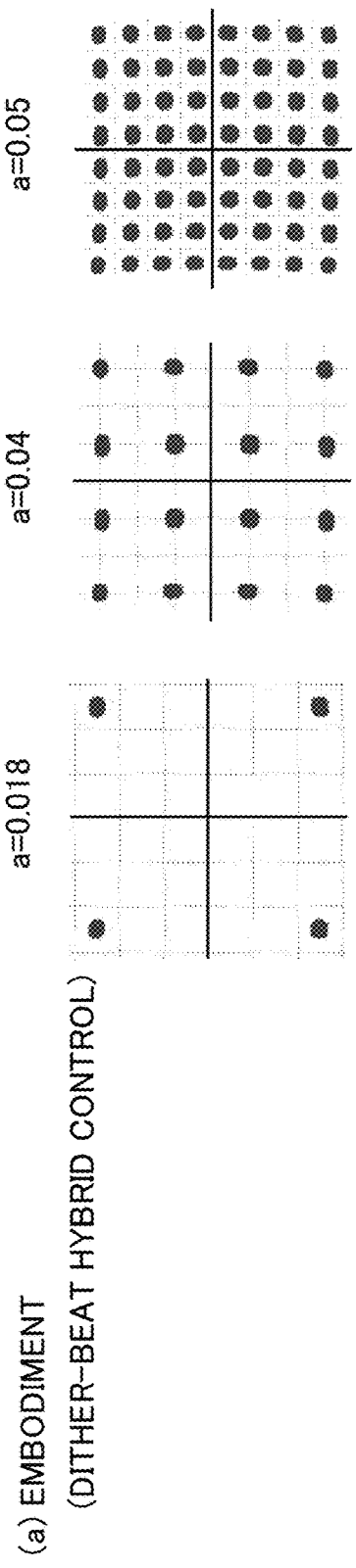
(a) EMBODIMENT (DITHER-BEAT HYBRID CONTROL)
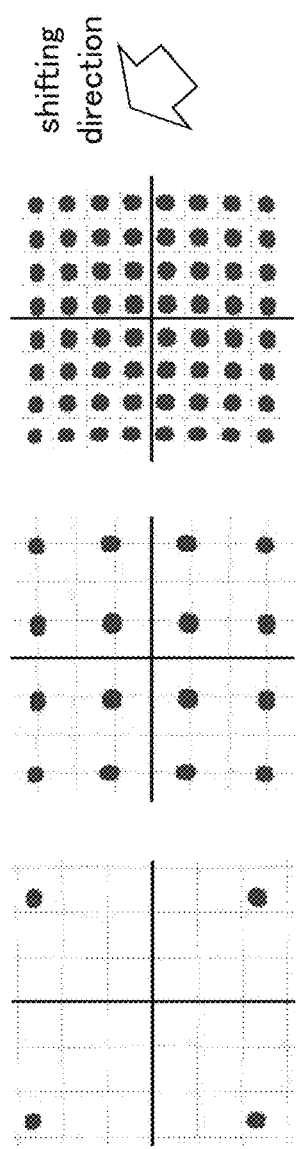
(b) FIRST HARMONIC CONTROL SCHEME (I-DITHER FOR I-BIAS, Q-DITHER FOR Q-BIAS)
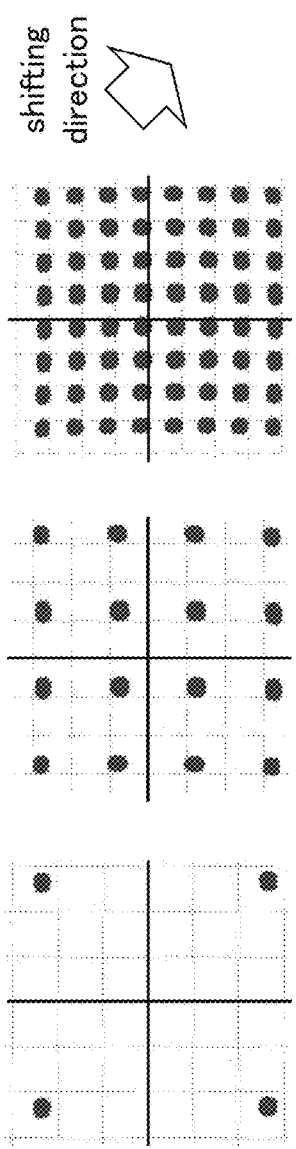
(c) BEAT FREQUENCY CONTROL SCHEME (Q-P BEAT FOR I-BIAS, I-P BEAT FOR Q-BIAS)

METHOD OF CONTROLLING OPTICAL MODULATOR, AND OPTICAL TRANSMITTER

CROSS-REFERENCE TO RELATED APPLICATIONS

This application is based upon and claims priority to earlier Japanese Patent Application No. 2021-026133 filed on Feb. 22, 2021, the entirety of which is incorporated herein by reference.

FIELD

The present disclosure relates to a control method of an optical modulator, and to an optical transmitter.

BACKGROUND

Along with the growth in communication traffic, digital coherent optical communication, which realizes high-speed and large-capacity data transmission, has become widespread. With a digital coherent scheme, the amount of data that can be transmitted is more than doubled in comparison with conventional intensity modulation/direct detection schemes, using in-phase (I phase) and the quadrature-phase (Q phase) optical signals having a phase difference of $\pi/2$ radians (i.e., 90 degrees) from each other.

In order to generate I-phase and a Q-phase optical signals, an IQ modulator is used in which two Much-Zehnder Modulators (MZMs) are connected in parallel, and a phase difference of $\pi/2$ radians (hereinafter, unit "radian(s)" will be omitted) is given between two optical signals generated by the respective MZMs. The two Mach-Zehnder modulators connected in parallel are called an I arm and a Q arm. The I arm and the Q arm configure one MZ interferometer. In general, bias control is performed so that each of the MZMs operates at the optimum bias point.

FIG. 1 shows a conventional bias control scheme. Dither signals oscillating at low frequencies are superimposed onto the I bias voltage (hereinafter, referred to simply as "I bias") applied to the I-arm MZM, the Q bias voltage (hereinafter, referred to simply as "Q-bias") applied to the Q-arm MZM, and the P bias voltage (hereinafter, referred to simply as "P bias") applied to a phase shifter that gives a phase difference of $\pi/2$. A part of the light output from the IQ modulator is monitored and converted into a digital signal. Based on the digital signal of the monitored light, the errors (i.e., the deviations from the optimum values) of I bias, Q bias, and P bias, are calculated. From the acquired error information, undesirable components such as noise components are removed by filtering, and control signals are generated. The previous bias points (or the bias voltages) are updated by the respective control signals, and new biases, on which the dither signals are superimposed, are fed back to the I bias, the Q bias, and the P bias.

For controlling the I bias and the Q bias, a control scheme that minimizes the average power of the monitor light is known. See, for example, Pak S. Cho et al., "Closed-Loop Bias Control of Optical Quadrature Modulator" IEEE PHOTONICS TECHNOLOGY LETTERS, VOL. 18, NO 21, Nov. 1, 2006, and Tsuyoshi Yoshida et al., "A Study on Automatic Bias Control for Arbitrary Optical Signal Generation by Dual-parallel Mach-Zehnder Modulator", ECOC 2010, 19-23 Sep. 2010 Tu. 3.A.6.

Another control technique having been reported is to control the I bias and the Q bias without superimposing a dither signal on the P bias. Such a control scheme is disclosed in Tsuyoshi Yoshida et al. described above, and in Hiroto Kawakami et al., "Auto bias control technique for optical 16-QAM transmitter with asymmetric bias dithering" 12 Dec. 2011, Vol. 19, No. 26, OPTICS EXPRESS B308. Meanwhile, a control scheme for minimizing the beat frequency component of the dither signals superimposed on biases other than the control target, during the control on the target bias, is proposed. See, Mohammad Sotoodeh, et al., "Modulator Bias and Optical Power Control of Optical Complex E-Field Modulators," JOURNAL OF LIGHTQAVE TECHNOLOGY, VOL. 29, NO 15, Aug. 1, 2011. This scheme is called "beat frequency" approach. Still another known method is to control the P bias based on the beat frequency of the dither signals superimposed on the I arm and the Q arm. See, for example, JP 2019-184844 A.

Optical loss is not always the same between the I arm and the Q arm, and an optical modulator has a finite extinction ratio. The extinction ratio is represented by the ratio between the intensity of the light remaining in the optical modulator in the OFF state and the intensity of the light output from the optical modulator in the ON state. If there is an intensity difference (or intensity imbalance) between two optical signals due to the difference in optical loss between the arms, residual light exists even if the optical modulator is turned off. In the ideal state, bias control is performed so that the average power of the monitor light is minimized, because the average power of the output light becomes the minimum as long as the optical modulator is driven with reference to the optimum bias point. However, if the extinction ratio is low, the operation is out of the ideal state. Accordingly, the bias point that minimizes the average power is not always the optimum bias point.

SUMMARY

It is one of the objectives to provide a bias control technique of tuning a bias voltage of an optical modulator to the optimum state.

According to an embodiment, a method of controlling of an optical modulator that includes a first child modulator configured to generate a first optical signal from the first light split from input light, a second child modulator configured to generate a second optical signal from the second light split from the input light, and a parent modulator configured to generate a third optical signal from the first optical signal and the second optical signal, is provided. The control method includes superimposing a first dither signal having a first frequency on a first bias signal and applying the first bias signal containing the first dither signal to the first child modulator, superimposing a second dither signal having a second frequency different from the first frequency on a second bias signal and applying the second bias signal containing the second dither signal to the second child modulator, superimposing a third dither signal having a third frequency different from the first frequency and the second frequency on a third bias signal and applying the third bias signal containing the third dither signal to the parent modulator, detecting a first error component having the first frequency and a second error component having a beat frequency of the second frequency and the third frequency, from the third optical signal, generating a first error signal from the first error component and the second error component, and adjusting the first bias signal according to the first error signal.

Other objectives and further features of the embodiments will be apparent from the following detailed description when read in conjunction with the accompanying drawings.

BRIEF DESCRIPTION OF THE DRAWINGS

FIG. 1 shows a conventional bias control scheme for an optical modulator;

FIG. 6 is a diagram showing an example of an dither signal waveform described in the first table;

FIG. 7 is a diagram showing an example of a waveform for I-bias error detection described in the second table;

FIG. 8 is a diagram showing an example of a waveform for Q-bias error detection described in the second table;

FIG. 12 is a diagram showing a technical effect of the embodiment based on comparison of constellations after bias convergence;

DETAILED DESCRIPTION

Figure 2A:
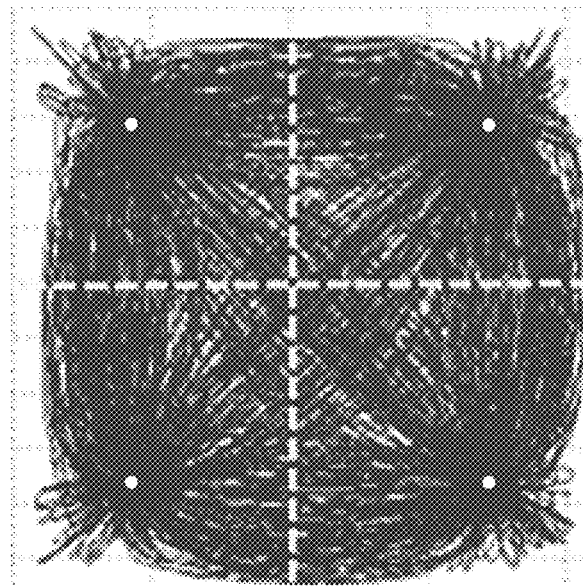
FIG. 2A is a diagram showing a constellation acquired by simulation analysis in the process leading to the embodiments.

First, a listing of the preferred modes is presented below. In the following description, the same or corresponding elements are designated by the same reference numerals, and explanations of the same or similar elements will not be provided.

[1] A method of controlling of an optical modulator that includes a first child modulator configured to generate a first optical signal from the first light split from input light, a second child modulator configured to generate a second optical signal from the second light split from the input light, and a parent modulator configured to generate a third optical signal from the first optical signal and the second optical signal, includes superimposing a first dither signal having a first frequency on a first bias signal and applying the first bias containing the first dither signal to the first child modulator, superimposing a second dither signal having a second frequency different from the first frequency on a second bias signal and applying the second bias signal containing the second dither signal to the second child modulator, superimposing a third dither signal having a third frequency different from both the first frequency and the second frequency on a third bias signal and applying the third bias signal containing the third dither signal to the parent modulator, detecting a first error component having the first frequency and a second error component having a beat frequency of the second frequency and the third frequency, from the third optical signal, generating a first error signal from the first error component and the second error component, and adjusting the first bias signal according to the first error signal.

By detecting the first error component having the first frequency, and the second error component having the beat frequency of the second and the third frequencies from the third optical signal, which is the output signal of the parent modulator, and by adjusting the first bias signal according to the first error signal generated from the first error component and the second error component, the bias of the optical modulator can be adjusted to the optimum state.

[2] The above-described method [1] may further include detecting a third error component having the second frequency and a fourth error component having the beat frequency of the first frequency and the third frequency, generating a second error signal from the third error component and the fourth error component, and adjusting the second bias signal according to the second error signal. With this method, the second bias signal is adjusted, in addition to the first bias signal, and the bias of the optical modulator can be adjusted more accurately to the optimum state.

[3] The above-described method [1] or [2] may further include multiplying at least one of the first error component and the second error component by a coefficient that represents a mixing ratio between the first error component and the second error component. In this case, the intensities of the first error component and the second error component are balanced, and the accuracy of the bias adjustment of the optical modulator is improved.

[4] The above-described method [2] may further includes multiplying at least one of the third error component and the fourth error component by a coefficient that represents a mixing ratio between the third error component and the fourth error component. In this case, the intensities of the third error component and the fourth error component are balanced, and the accuracy of the bias adjustment of the optical modulator is improved.

[5] The above-described method [2] may further includes multiplying at least one of the first error component and the second error component by a first coefficient that represents a mixing ratio between the first error component and the second error component, and multiplying at least one of the third error component and the fourth error component by a second coefficient that represents a mixing ratio between the third error component and the fourth error component. In this case, the intensity balance between the first error component and the second error component, and the intensity balance between the third error component and the fourth error component are maintained, and the accuracy of the bias adjustment of the optical modulator is further improved.

[6] In any one of [1] to [5], the ratio between the first frequency, the second frequency, and the third frequency is determined so that a beat frequency of the second frequency and the third frequency is different from the first frequency. By selecting such frequencies, the dither component applied to the bias of the first child modulator to be controlled, and the beat component of the dithers applied to the bias voltages of modulators other than the target modulator do not interfere with each other, and both components can be detected correctly.

[7] In the method of [6], the ratio between the first frequency, the second frequency, and the third frequency is determined so that a beat frequency of the first frequency and the third frequency is different from the second frequency. By selecting such frequencies, the dither component applied to the bias of the second child modulator, which is the target bias, and the beat component of the dithers applied to biases other than the target bias do not interfere with each other, and the both components can be correctly detected.

[8] An optical transmitter includes an optical modulator, in which a first child modulator and a second child modulator are connected in parallel to form a parent modulator, and a bias controller that controls a first bias signal applied to the first child modulator and a second bias signal applied to the second child modulator, wherein the bias controller includes a waveform generating circuit configured to generate a first dither signal having a first frequency that is superimposed on the first bias signal, a second dither signal having a second frequency different from the first frequency that is superimposed on the second bias signal, and a third dither signal having a third frequency different from both the first frequency or the second frequency that is superimposed on the third bias signal applied to the parent modulator, and a bias control circuit that includes a first circuit configured to detect a first error component of monitored optical power of an output light from the optical modulator having the first frequency, a second circuit configured to detect a second error component of monitored optical power of the output light having a beat frequency of the second frequency and the third frequency, and an adder configured to generate a first error signal for controlling the first bias signal based on the first error component and the second error component.

With the above-described configuration of the bias controller, the bias of the optical modulator is adjusted to the optimum state, and the performance of the optical transmitter is improved.

[9] In the configuration of [8], the bias control circuit further includes a third circuit configured to detect a third error component of monitored optical power of the output light having the second frequency, a fourth circuit configured to detect a fourth error component of monitored optical power of the output light having a beat frequency of the first frequency and the third frequency, and a second adder configured to generate a second error signal for controlling the second bias signal based on the third error component and the fourth error component. With this configuration, the second bias signal is controlled, in addition to the first bias signal, and the accuracy of the bias control on the optical modulator used in the optical transmitter is improved.

[10] In the configuration of [9], at least one of the first circuit and the second circuit has a coefficient multiplier configured to multiply a coefficient that represents the mixing ratio between the first error component and the second error component. With this configuration, the intensities of the first error component and the second error component are balanced, and the accuracy of the bias on the optical modulator of the optical transmitter is improved.

[11] In the configuration of [9], at least one of the third circuit and the fourth circuit has a second coefficient multiplier configured to multiply a second coefficient that represents a mixing ratio between the third error component and the fourth error component. With this configuration, the intensities of the third error component and the fourth error component are balanced, and the accuracy of the bias control on the optical modulator of the optical transmitter is improved.

[12] In the configuration of [9], at least one of the first circuit and the second circuit has a coefficient multiplier configured to multiply a coefficient that represents a mixing ratio between the first error component and the second error component, and at least one of the third circuit and the fourth circuit has a second coefficient multiplier configured to multiply a second coefficient that represents a mixing ratio between the third error component and the fourth error component. In this case, the intensity balance between the first error component and the second error component, and the intensity balance between the third error component and the fourth error component are maintained, and the accuracy of the bias control on the optical modulator of the optical transmitter is further improved.

[13] In any one of [8] to [12], the ratio between the first frequency, the second frequency, and the third frequency is selected such that the beat frequency of the second frequency and the third frequency is different from the first frequency. With this configuration, the dither component applied to the bias of the first child modulator, which is the target of the bias control, is correctly detected without interference with beat component of the dithers applied to the bias voltages of modulators other than the target modulator.

[14] In the configuration of [13], the ratio between the first frequency, the second frequency, and the third frequency is set such that the second frequency and a beat frequency of the first frequency and the third frequency are different from each other. Consequently, the dither component applied to the bias of the second child modulator, which is the target of bias control, is correctly detected without interference with the beat component of the dithers applied to the bias voltages of modulators other than the target modulator.

Prior to explaining the bias control of the embodiments in detail, the constellations acquired by the simulation analysis performed in the process leading to the embodiments will be described with reference to FIG. 2A, FIG. 2B, and FIG. 2C. This simulation analysis is to analyze the influence of the deviation from the optimum bias due to the decrease in the extinction ratio, and is the basis for the schemes of the embodiments. In the following description, the MZ modulators used in the I arm and Q arm of an IQ modulator is referred to as "child MZMs", and the full MZ interferometer formed by the I arm and Q arm is referred to as a "parent MZM". The team "bias" shall mean a DC bias voltage unless otherwise noted.

[Simulation Analysis of Conventional Methods]

Figure 2B:
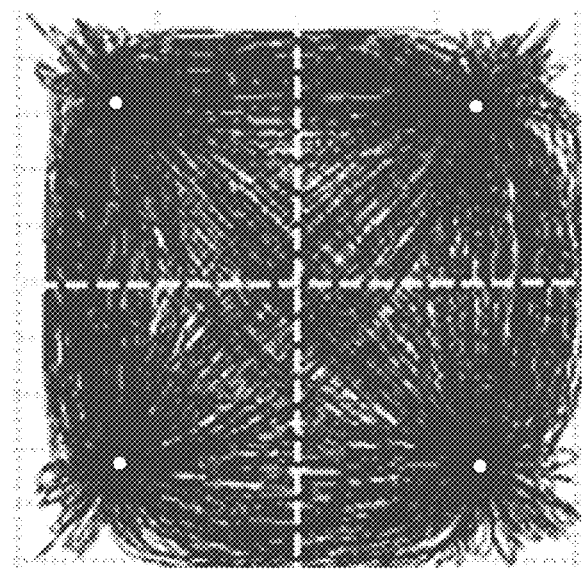
FIG. 2B is a diagram showing a constellation acquired by simulation analysis in the process leading to the embodiments.
Figure 2C:
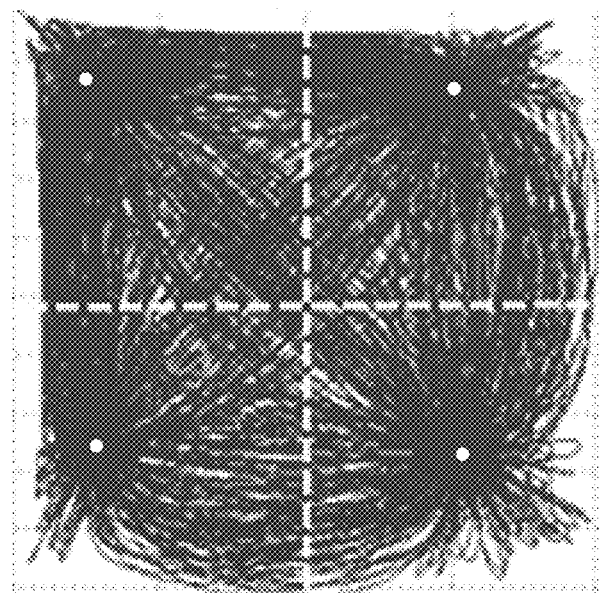
FIG. 2C is a diagram showing a constellation acquired by simulation analysis in the process leading to the embodiments.

FIGS. 2A, 2B, and 2C show the simulation analysis results (i.e., constellations) of the conventional methods. Under the condition that the extinction ratio of the optical modulator is low, and that the bias condition of the child MZMs is set to three different fixed levels, trajectories of transient response and constellation points (white dots) are shown. In these figures, the horizontal axis represents the I (in-phase) axis (also referred to as the real axis), and the vertical axis represents the Q (quadrature-phase) axis (also referred to as the imaginary axis). The I-axis and the Q-axis intersect at the origin. In the simulation analysis, the branch ratio of two arms of the child MZM is set so that the extinction ratio is 20 dB at each of the I arm and the Q arm. The trajectory of the transient response is a plot of the trajectory of the optical electric field of the output of the IQ modulator. No dither signals are superimposed on the modulator biases. Each of the constellation points (i.e., the symbol points) represents the magnitude of the electric field acquired by sampling the output of the IQ modulator at the symbol period.

In FIG. 2A, the bias is fixed to the null point at which the child MZM is most extinguished. In FIG. 2B, the bias is fixed to a bias point at which the IQ offset, namely, the intensity imbalance of the QAM symbol points is minimized. In FIG. 2C, the bias is fixed to a bias point at which the average power of the output light of the optical is minimized.

In FIG. 2A, with a low extinction ratio, the optical electric field output from the child MZM does not pass through the origin of the IQ complex plane. As a result, an offset occurs in the quadrature component (Q component), and the symbol points are shifted in the bottom right direction (toward the fourth quadrant) with respect to the origin. For instance, the center of the four white dots is is shifted in the bottom right direction with respect to the origin. The direction of deviation is determined by which of the two arms configuring the child MZMs has a greater optical loss, and accordingly, the direction of deviation is not always to the fourth quadrant.

Normally, the child MZM is biased so that the phase difference between the light beams passing through the two optical waveguides is 180 degrees in the absence of a radio frequency (RF) drive signal. Assuming that the two optical waveguides forming the child MZM have the same optical loss, then the two light beams travelling through the two optical waveguides are 180 degrees out of phase, and the output light of the child MZM is completely extinguished (with almost zero intensity).

In this state, upon applying drive signals that cause the phases of the two light beams travelling through the two optical waveguides of the child MZM to symmetrically change in the clockwise and counterclockwise directions, imaginary parts cancel each other in the complex electric field of the light signal output from the child MZMs. As a result, an amplitude-modulated signal that moves along the I-axis (with the intensity continuously changing between two phases of 0 and π) is acquired according to the magnitude of the drive signal.

If the extinction ratio of the output of the child MZM is low due to an imbalance of optical loss, the imaginary part remains and the trajectory of the transient response passes through a point offset from the origin toward the Q-axis direction. If the extinction ratio of the I arm is small, the Q bias appears to be offset. If the extinction ratio of the Q arm is small, then the I bias appears to be offset.

In order to minimize the offset between the I bias and the Q bias caused by the bias control of FIG. 2A, the bias applied to the child MZM may be adjusted. In this case, the four white dots are symmetric with respect to the origin, as shown in FIG. 2B. In the vertical direction, the four white dots are line-symmetric with respect to the I axis, and in the horizontal direction, line-symmetric with respect to the Q axis. However, with this bias tuning, the center of the drive signal of the child MZM deviates from the null point, and the overshoot approaches the limit value in the region of the top left (i.e., the second quadrant) of the IQ complex plane. The trajectory of the transient response shifts toward the second quadrant, and the symbol points (i.e., the constellation points) become asymmetric both in the vertical and horizontal directions. Due to this trajectory imbalance on the IQ complex plane, the average power of the output light, namely, the combination of the I-phase optical signal and the Q-phase optical signal (IQ signal synthesis), is not minimized.

As shown in FIG. 2C, if the bias applied to the child MZM is further adjusted in order to minimize the average power of the IQ combined optical signal, then the transient trajectory is further shifted toward the top left direction. Under this condition, the constellation points shift in the direction opposite to that of FIG. 2A. For instance, the center of the four white dots shifts in the top left direction with respect to the origin.

From the above, it is understood that, using the bias control scheme of minimizing the average power of the child MZM (shown in FIG. 2C), the bias deviates from the optimum value when the extinction ratio of the child MZM is low. On the contrary, using the control scheme of FIG. 2A for bringing the bias to the point at which the child MZM is most extinguished, the bias deviates from the optimum value in the direction opposite to FIG. 2C where the bias is controlled so as to minimize the average power. The magnitude of the deviation from the optimum value may vary depending on modulator parameters such as the modulation amplitude, the peak to average power ratio (PAPR), the modulation format, etc.

Meanwhile, it is said that, with the beat-frequency bias control on the child MZM described in Mohammad Sotoodeh, et al., the bias converges to the null point regardless of the modulator's parameters. However, according to the simulation analysis result made by the inventor, it is found that the bias does not converge to the optimum point when the extinction ratio of the modulator is low. With the beat frequency approach, the constellation points shift in the same direction as in FIG. 2A.

In the conventional bias control, the amplitude of the bias is modulated using a single dither signal (i.e., a low-frequency small signal), and adjusting the bias so as to minimize the dither component synchronously detected from the monitor light. However, according to the simulation analysis result made by the inventor, it is again found that the bias does not converge to the optimum point when a modulator parameter, such as the extinction ratio, is not ideal. With the bias control to minimize the synchronously detected dither component, the constellation points shift in the same direction as in FIG. 2C.

Based on the above findings, a control method and a configuration for adjusting the bias applied to the child MZM to the optimum value are achieved according to the embodiments, even if an optical modulator has a finite extinction ratio.

Example of Configuration of Optical Transmitter

Figure 3:
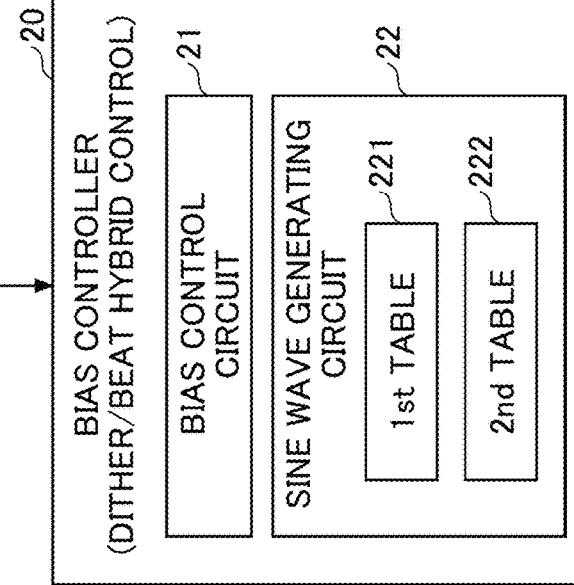
FIG. 3 is a schematic diagram of an optical transmitter according to an embodiment.
Figure 4:
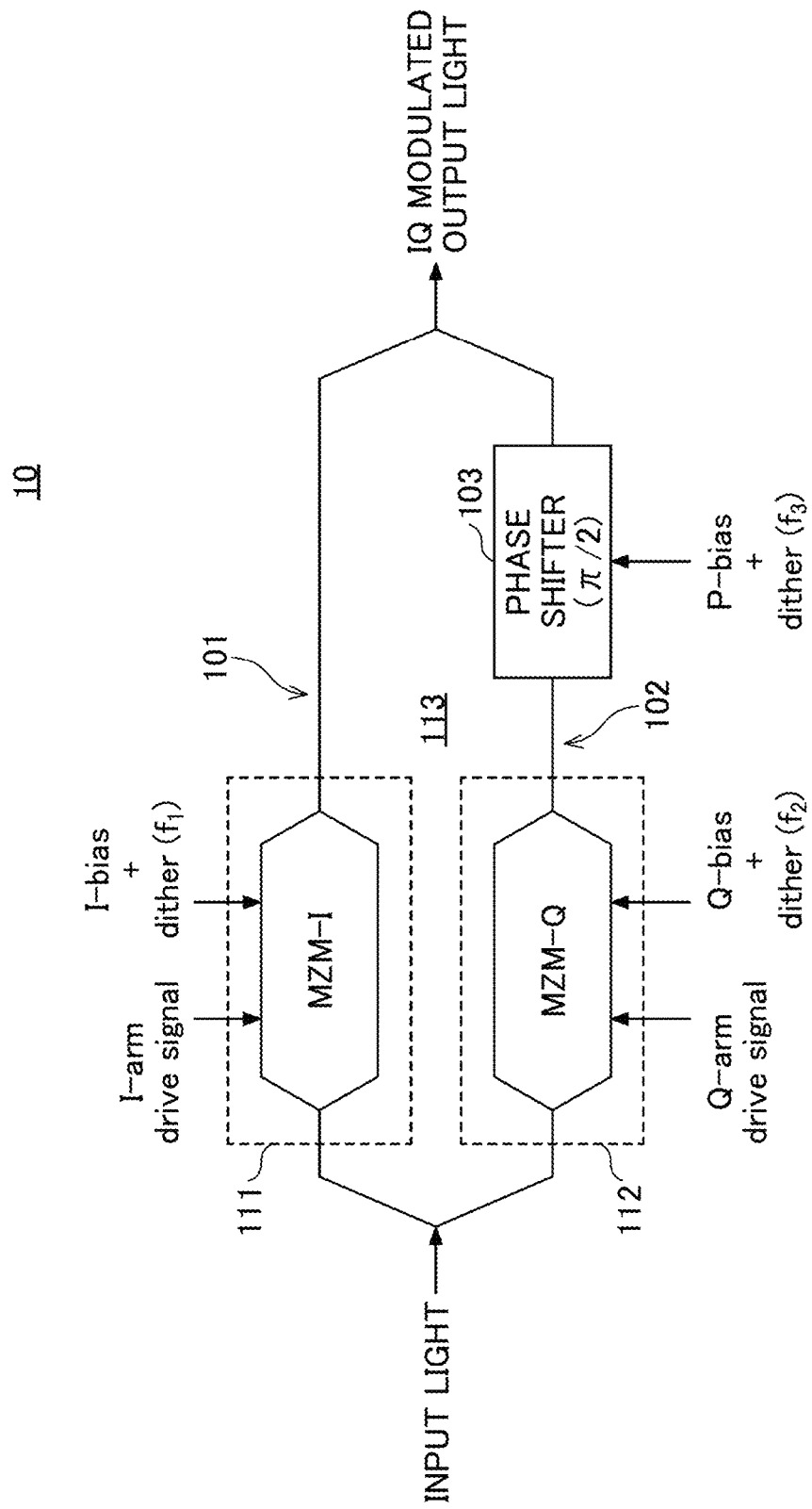
FIG. 4 is a schematic diagram of an optical modulator used in the optical transmitter.

FIG. 3 is a schematic diagram of an optical transmitter 1 to which the bias control of the embodiment is applied, and FIG. 4 is a schematic diagram of an optical modulator 10 used in the optical transmitter 1. The optical transmitter 1 has an optical modulator 10 and a bias controller 20 that controls a bias applied to the optical modulator 10. The bias controller 20 performs hybrid control that combines the beat frequency approach and a dither control scheme for minimizing the dither component contained in the optical power monitor output from the optical modulator 10.

Hybrid control is conceived based on the findings from the simulation analysis of FIG. 2A to FIG. 2C. The symbol deviating direction of the control scheme of minimizing the synchronously detected dither component, and the symbol deviating direction of the beat frequency approach are opposite to each other. Therefore, by combining the two control methods, the deviation of the symbols can be minimized, and the bias can be tuned to the optimum state. Details of the hybrid control will be described later with reference to FIG. 5.

As shown in FIG. 4, the optical modulator 10 is an MZ IQ modulator. The optical modulator 10 has an I arm 101, in which a first child MZM 111 (denoted as "MZM-I" in the figure) is provided, and a Q arm 102, in which a second child MZM 112 (denoted as "MZM-Q" in the figure) is provided. A parent MZM 113 is formed by the I arm 101 and the Q arm 102. A phase shifter 103 is provided to either the I aim 101 or the Q arm 102. In the example of FIG. 4, the Q arm 102 is provided with the phase shifter 103. The phase shifter 103 rotates the phase of the travelling optical signal by 90 degrees (π/2). The position of the phase shifter 103 is not limited to either one of the arms, but the IQ modulator may be driven differentially so that a phase difference of 90 degrees is provided between the arms.

The light input to the optical modulator 10 is split into two, and the split lights travel through the I arm 101 and the Q arm 102. The light travelling through the I arm 101 is modulated by the I-arm drive signal input to the child MZM 111 (i.e., the first child modulator), and an I-phase optical signal is generated. The I-phase optical signal propagates through the I-arm 101. The light travelling through the Q arm 102 is modulated by the Q-arm drive signal input to the child MZM 112 (i.e., the second child modulator), and a phase rotation of π/2 is given by the phase shifter 103. A Q-phase optical signal is generated by the child MZM 112 and the phase shifter 103. The Q-phase optical signal propagates through the Q-aim. The I-phase optical signal and the Q-phase optical signal having a phase difference of π/2 between them are combined at the output port of the parent MZM 113 (i.e., the parent modulator) and output from the optical modulator 10.

Although details are omitted, the I-arm drive signal may be composed of a pair of differential signals input in the positive and the negative phases to the signal electrodes provided onto the two optical waveguides of the child MZM 111. Similarly, the Q-arm drive signal may be composed of a pair of differential signals input in the positive and the negative phases to the signal electrodes provided onto the two optical waveguides of the child MZM 112. With this configuration, the drive voltage can be reduced by push-pull operation.

In order to operate each of the MZMs with the optimum bias, I bias (i.e., a first bias signal) on which a dither signal (i.e., a first dither signal) with a frequency f1 is superimposed is applied to the child MZM 111. The I-bias with the superimposed dither signal of frequency f1 is slightly amplitude-modulated by a minute sinusoidal signal of frequency f1, and contains a frequency component of f1. A Q bias (i.e., a second bias signal) on which a dither signal (i.e., a second dither signal) with a frequency f2 is superimposed is applied to the child MZM 112. The Q bias with the superimposed dither signal of frequency f2 is slightly amplitude-modulated by a minute sinusoidal signal of frequency f2, and contains a frequency component of f2. A P bias (i.e., a third bias signal) on which a dither signal (i.e., a third dither signal) with a frequency f3 is superimposed is applied to the phase shifter 103. The P bias with the superimposed dither signal of the frequency f3 is slightly amplitude-modulated by a minute sinusoidal signal having the frequency f3, and contains a frequency component of f3. The frequencies f1, f2, and f3 of the dither signals (hereinafter abbreviated as "dithers") are sufficiently low, compared with the lower limit of the frequency range of the radio frequency drive signals, and the dither frequencies are selected from the range of, for example, several kilohertz (kHz) to several hundred kilohertz (kHz).

The frequencies f1, f2, and f3 of the respective dithers, superimposed on the I bias, the Q bias, and the P bias, are different from each other. More precisely, the frequency f1 is different from both the frequency f2 and the frequency f3, is not an integer-multiple of these frequencies, and is different from the beat frequency of f2 and f3, e.g., |f2−f3|. The frequency f2 is different from both the frequency f1 and the frequency f3, is not an integer-multiple of these frequencies, and is different from the beat frequency of f1 and f3, e.g., |f1−f3|. Specific examples of such dither waveforms will be described later.

Returning to FIG. 3, a portion of the output light of the optical modulator 10 is converted into a current signal by the photodetector (denoted as "PD" in the figure) 11. The current signal flows through the resistance element, and is converted into a voltage signal, which serves as a monitor signal. The monitor signal is converted into a digital signal by an analog-to-digital converter (ADC) 12, and input to the bias controller 20.

The bias controller 20 has a bias control circuit 21 and a sine wave generating circuit (waveform generation circuit) 22. The sine wave generating circuit 22 generates a sine wave used for the bias control. A cosine wave may be used in place of the sine wave, because any phases may be employed for the dither signals. The sine wave generating circuit 22 has a first table 221 which has sine wave information for generating dithers, and a second table 222 which has another sine wave information for error detection. The first table 221 has voltage values of the I-dither waveform to be superimposed on the I bias, voltage values of the Q-dither waveform to be superimposed on the Q bias, and voltage values of the P-dither waveform to be superimposed on the P bias. The I dither is, for example, a first sine wave having a frequency of f1. The Q dither is, for example, a second sine wave having a frequency of f2. The P dither is, for example, a third sine wave having a frequency of f3. As described above, the frequencies f1, f2, and f3 are different from each other. The second table 222 has voltage values of the dither waveform superimposed on the bias of the control target, and voltage values of the beat waveform of the dithers superimposed on the biases other than the control target.

The bias control circuit 21 applies the I dither of the frequency f1, the Q dither of the frequency f2, and the P dither of the frequency f3 to the I bias, the Q bias, and the P bias, respectively, with reference to the first table 221. For example, the bias control circuit 21 sequentially reads out the voltage values of the I-dither waveform having a frequency f1 from the first table 221 at constant time intervals, adds the readout voltage values to the I bias, and outputs the I bias to which the I-dither waveform has been added to the DAC 13. Thus, the I bias on which the I dither of the frequency f1 is superimposed is supplied from the DAC to the optical modulator 10. The same process is performed for the Q dither and the P dither. The bias control circuit 21 also refers to the second table 222 to detect an error component contained in the digital monitor signal received from the ADC 12, and controls the I bias and the Q bias in the direction of minimizing the error.

In controlling the I bias, the bias control circuit 21 detects a dither component (i.e., the first error component) the same as the I dither, and a beat frequency component (i.e., the second error component) of the Q dither and the P dither from the digital monitor signal. The bias control circuit 21 generates a control signal for controlling the I bias based on the first error component and the second error component, and adjusts the I bias level.

In controlling the Q bias, the bias control circuit 21 detects a dither component (i.e., the third error component) the same as the Q dither, and a beat frequency component (i.e., the fourth error component) of the I dither and the P dither from the digital monitor signal. The bias control circuit 21 generates a control signal for controlling the Q bias based on the third error component and the fourth error component, and adjusts the Q bias level.

Example of Configuration of Bias Control Circuit

Figure 5:
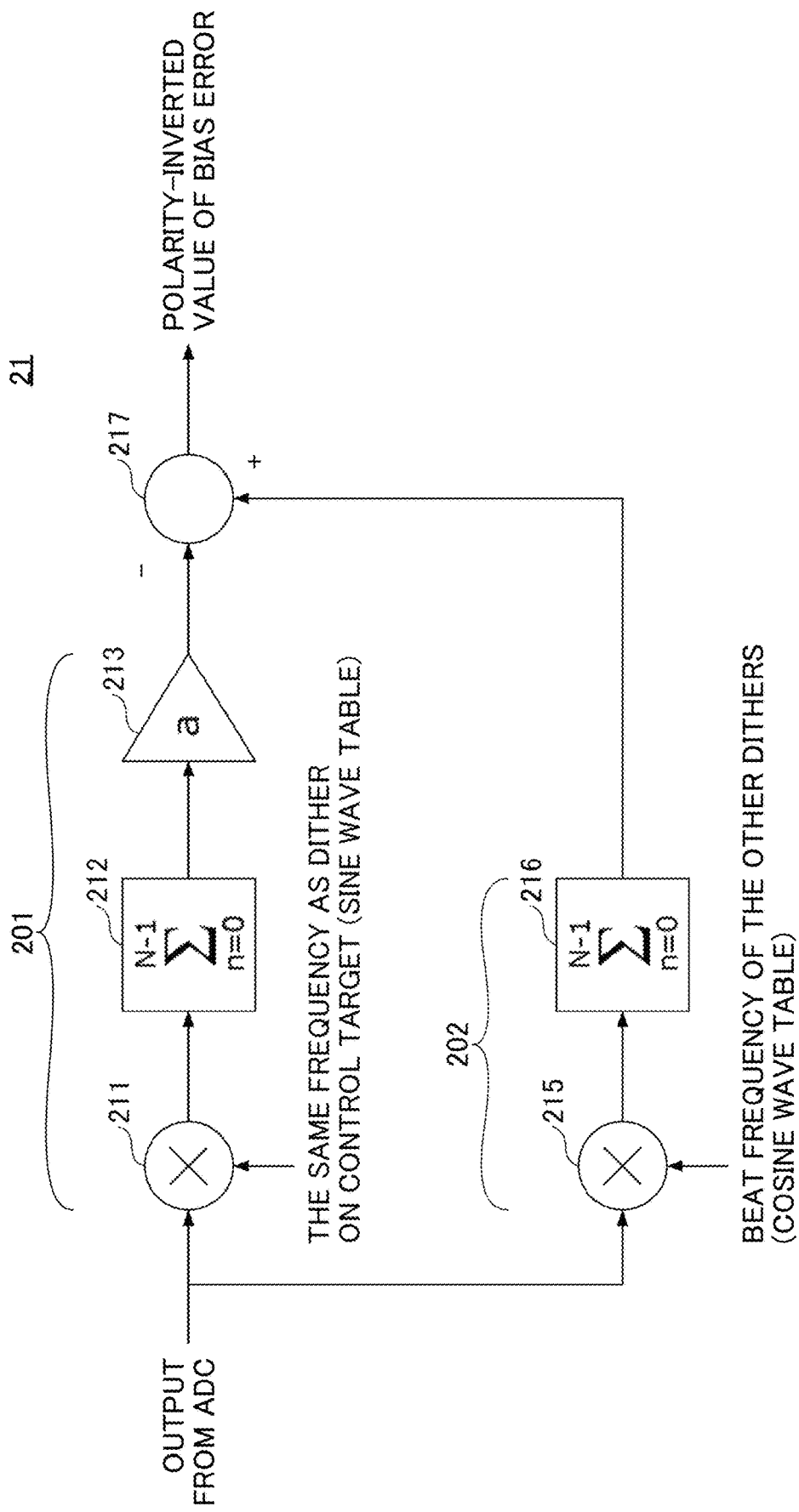
FIG. 5 is a schematic diagram of a bias control circuit according to an embodiment.

FIG. 5 shows an example of configuration of the bias control circuit 21 according to the embodiment. The bias control circuit 21 has a first circuit 201 and a second circuit 202 connected in parallel. The first circuit 201 detects a component produced in accordance with the dither signal superimposed on the bias of the control target from the digital monitor signal supplied from the ADC 12. The second circuit 202 detects the beat frequency component produced in accordance with the dither signals superimposed on the biases other than the target bias.

Specifically, the first circuit 201 has a multiplier 211, an integrator 212, and a coefficient multiplier 213. The second circuit 202 has a multiplier 215 and an integrator 216.

In controlling the I bias, the multiplier 211 of the first circuit 201 uses the sine wave information (or the waveform information) of the I dither of the frequency f1 saved in the second table 222 to synchronously detect the I dither component contained in the digital monitor signal. Because of the synchronous detection of the dither frequency itself superimposed on the I bias, this detection method may be called a "first harmonic approach". The synchronously detected dither components are summed up by the integrator 212. The integrator 212 cumulatively adds the Fourier components of the detected dither components acquired from N sampling data items (sampling numbers 0 to N-1). If a loop filter is inserted in the first circuit 201, N may be the number of samples in the update period of the loop filter.

During this process, the multiplier 215 of the second circuit 202 uses the sine wave information (or the waveform information) of the beat frequency of f2 and f3, such as |f2-f3|, described in the second table 222 to detect the beat frequency component of the Q dither and P dither from the digital monitor signal. The phase of the cosine wave is 90-degree different from that of the sine wave, and therefore, the sine wave information may be used as cosine wave information by shifting the phase of the sine wave information by one quarter of the period. The detected beat frequency components are summed up by the integrator 216. The integrator 216 cumulatively adds the detected beat frequency components of N sampling data items (sampling numbers 0 to N-1). If a loop filter is inserted in the second circuit 202, N may be the number of samples in the update period of the loop filter.

In controlling the Q bias, the multiplier 211 of the first circuit 201 uses the sine wave information (or the waveform information) of the Q dither of the frequency f2 saved in the second table 222 to synchronously detect the Q dither component contained in the digital monitor signal using the first harmonic approach. The synchronously detected dither components are summed up by the integrator 212. The integrator 212 cumulatively adds the Fourier components of the detected dither components acquired from N sampling data items (sampling numbers 0 to N-1).

During this process, the multiplier 215 of the second circuit 202 uses the sine wave information (or the waveform information) of the beat frequency of f1 and f3, such as |f1-f3|, described in the second table 222 to detect the beat frequency component of the I dither and P dither from the digital monitor signal. The detected beat frequency components are summed up by the integrator 216. The integrator 216 cumulatively adds the Fourier components of the detected beat frequency components acquired from N sampling data items (sampling numbers 0 to N-1).

The sum of the Fourier components calculated by the integrator 212 of the first circuit 201 is input to the coefficient multiplier 213, and weighted by a coefficient "a". For the I bias control process, the coefficient "a" represents the mixing ratio between the synchronously detected I dither component (i.e., the first error component) and the beat frequency component of the Q dither and the P dither (i.e., the second error component). For the Q bias control process, the coefficient "a" represents the mixing ratio between the synchronously detected Q dither component (i.e., the third error component) and the beat frequency component of the I dither and the P dither (i.e., the fourth error component).

The intensity of the dither component detected from the digital monitor signal is higher than the intensity of the beat frequency component. By multiplying the coefficient "a", the intensities of the dither component and the beat frequency component can be balanced. The detected beat frequency component (i.e., the second or the fourth error component) may be weighted, in place of or in addition to the detected dither component (i.e., the first or the third error component), as long as the intensities of the detected dither component and the beat frequency component are balanced. The inventor found that the error detection accuracy may be improved by bringing the spectral intensity of the dither component to match with the spectral intensity of the beat frequency component because the detection sensitivity of the dither component is higher than the detection sensitivity of the beat frequency component. To weight the dither component, the value of the coefficient "a" may be selected from, for example, the range of 0.01 to 0.1.

The adder 217 adds the output value of the coefficient multiplier 213 and the output value of the integrator 216. That is, the weighted dither component and the detected beat frequency component are added up. In the figure, the signs of the two inputs of the adder 217 are opposite to each other so that the slopes of the error detection characteristic (namely, the relationship between the magnitude of the bias deviation and the calculated bias error) match each other, or that the bias control can be performed in the direction of reducing the error. This is equivalent to inverting the signs of the values described in the synchronous detection table, and is not directly relevant to the present disclosure. The point is to add the two types of errors, while bringing the control polarities or directions to be consistent with each other, so as to cancel the offset components of the error detection characteristics (having opposite offset directions).

The adder 217 may output an error signal after the polarity of the total error is inverted. If the total error represents a deviation in the positive direction, an error signal for controlling the bias in the negative direction is output. If the total error represents a deviation in the negative direction, then an error signal for controlling the bias in the positive direction is output.

The bias controller 20 updates the bias level of the control target, based on the error signal output from the bias control circuit 21. As has been described above, a control signal in which the corresponding dither is superimposed on the updated bias level is converted into an analog signal by the DAC 13 (see FIG. 3), and input to the bias electrode (i.e., the DC electrode) of the optical modulator 10.

With this bias control, the bias level of the optical modulator can be adjusted to the optimum state even if the extinction ratio has deteriorated at one of the arms. The bias control circuit 21 may be implemented by, for example, a processor and a memory. In place of the processor, a logic device with a built-in memory such as a field programable gate array (FPGA) may be used.

Example of Sine Wave Saved in Sine Wave Table

FIG. 6 shows an example of waveform information items saved in the first table 221 and used for dither generation. The first table 221 has an I bias dither (a), a Q bias dither (b), and a P bias dither (c). In this example, the digital waveform recorded in the first table 221 is composed of 42 samples.

The ratio (f1:f2:f3) between the frequency f1 of the I bias dither, the frequency f2 of the Q bias dither, and the frequency f3 of the P bias dither is, for example, 7:6:4. The frequencies f1, f2, and f3 are different from each other, each being not an integer multiple of the others. In addition, the beat frequency of the frequencies f2 and f2 (e.g., |f2−f3|) does not overlap the frequency f1, and the beat frequency of the frequencies f1 and f3 (e.g., |f1−f3|) does not overlap the frequency f2. By selecting such frequencies, the dither component having the same frequency as the dither signal applied to the bias to be controlled and the beat component of the dithers applied to the other biases can be correctly detected without interference between them. As long as this condition is satisfied, the frequency ratio between f1, f2, and f3 may be determined to any ratio. For example, the ratio f1:f2:f3 may be set to 8:7:5.

In the example of FIG. 6, each dither is illustrated as a digital waveform, but it may be described as a function. In the latter case, the bias controller 20 may generate a digital dither to be superimposed on the adjusted bias by referring to the function described in the first table 221.

FIG. 7 shows an example of waveform information items saved in the second table 222 and used for detecting the I bias error. The digital waveform in the second table 222 is composed of, for example, 42 samples.

The waveform information for detecting an I bias error includes an I dither waveform information item for synchronous detection of the I dither component (i.e., the first error) contained in the digital monitor signal, and a beat waveform information item for detecting a beat frequency component of the Q dither and the P dither (i.e., the second error) contained in the digital monitor signal.

FIG. 8 shows an example of waveform information items saved in the second table 222 and used for Q bias error detection. The digital waveform in the second table 222 is composed of, for example, 42 samples.

The waveform information for detecting an Q bias error includes a Q dither waveform information item for synchronous detection of the Q dither component (i.e., the third error) contained in the digital monitor signal, and a beat waveform information item for detecting a beat frequency component of the I dither and the P dither (i.e., the fourth error) contained in the digital monitor signal.

In FIG. 7 and FIG. 8, the frequency ratio (f1:f2:(f2−f3):(f1−f3)) between I dither, Q dither, QP beat, and IP beat is 7:6:2:3 when f1:f2:f3=7:6:4. The ratio (f1:f2:(f2−f3):(f1−f3)) is 8:7:2:3 when f1:f2:f3=8:7:5. Any other appropriate ratio may be used.

The I dither waveform information item for detecting the I bias error may be shared between the first table 221 and the second table 222. The Q dither waveform information item for detecting the Q bias error may be shared between the first table 221 and the second table. The Q-P beat and the I-P beat may be generated from the waveform information items saved in the first table 221. In FIG. 7 and FIG. 8, difference frequency representing the difference between two frequencies is used as the beat frequency; however, the average of the difference frequency and the sum frequency may be used. The sum frequency represents the sum of the two frequencies. By using both difference frequency and sum frequency, fluctuation can be reduced.

[Fourier Component in Error Detection Using Dither]

Figure 9A:
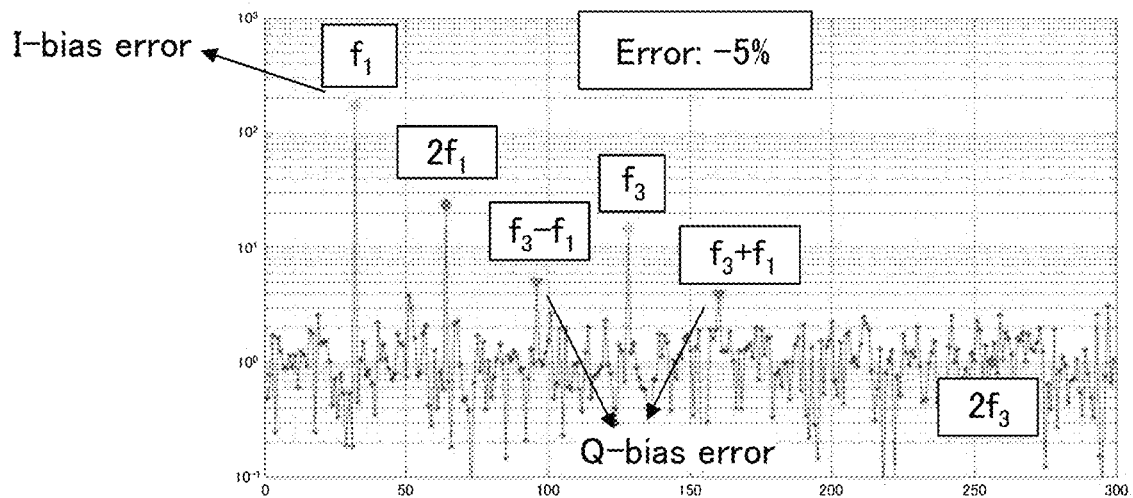
FIG. 9A is a diagram showing a Fourier component observed when an error is detected under dither superposition.
Figure 9B:
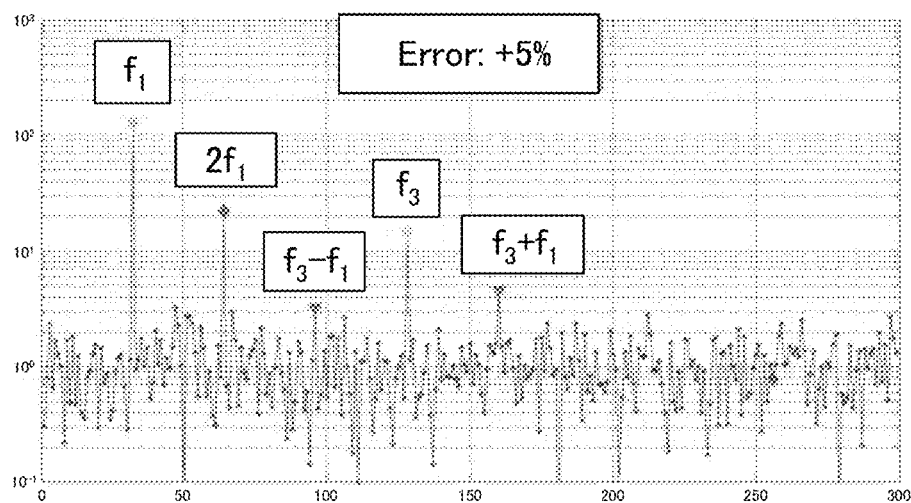
FIG. 9B is a diagram showing a Fourier component observed when an error is detected under dither superposition.
Figure 9C:
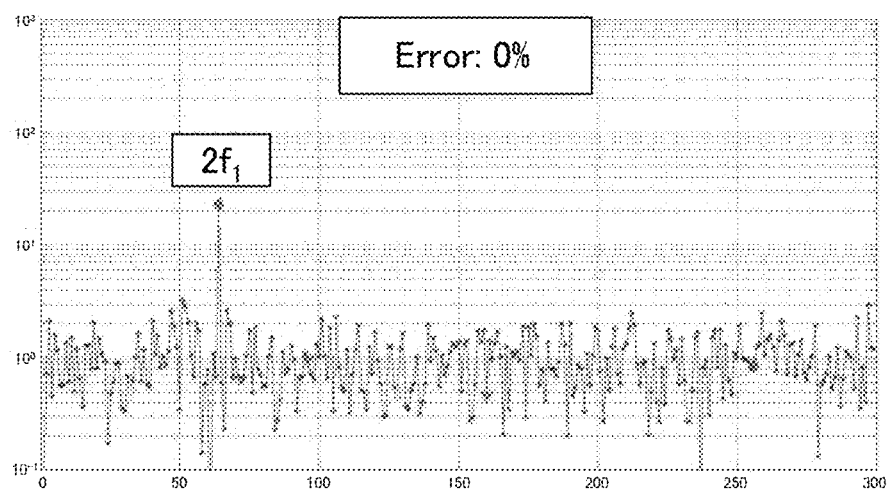
FIG. 9C is a diagram showing a Fourier component observed when an error is detected under dither superposition.

FIG. 9A, FIG. 9B, and FIG. 9C show Fourier components acquired by error detection under dither superposition. In these figures, I dither (f1) and P dither (f3) are superimposed on the bias, and the input light is modulated by 16-level quadrature amplitude modulation (16QAM).

The Fourier components illustrated in FIG. 9A, FIG. 9B, and FIG. 9C are acquired when the errors detected by the bias control circuit 21 are −5%, +5%, and 0%, respectively. The f1 component observed in FIG. 9A and FIG. 9B indicates an I-bias error. With the first harmonic approach, the bias control is performed so as to minimize the detected f1 component. The f3 component alone is not used for the I bias control or Q bias control.

Difference frequency "f3−f1" representing the difference between P dither and I dither, and sum frequency "f3+f1" representing the sum of the P dither and the I dither are also indicated. The term "beat frequency" generally refers to a difference frequency, but within the scope of this specification and claims, the sum frequency "f3+f1" is also included in the beat frequency component. At least one of "f3−f1" and "f3+f1" is/are used as a beat frequency component when controlling the Q bias.

The "2f1" component observed in FIG. 9A to FIG. 9C is a frequency component twice the f1. It is considered that the 2×f1 frequency component is produced by the dither signal being folded back and vibrating twice at the valley (bottom) of the modulation curve in one cycle of dither oscillation. The 2×f1 component is observed both when the bias is at the optimum level and when the bias deviates from the optimum level, as long as the dither oscillates at the bottom of the modulation curve.

In FIG. 9C without error, neither the f1 component nor the beat frequency component (f3−f1 and f3+f1) is observed in the output data of the bias control circuit 21, and only the 2×f1 component appears. In this case, the bias of the child MZM is at the optimum level, and the bias controller 20 maintains this bias level.

[Control Flow by Bias Controller]

Figure 10:
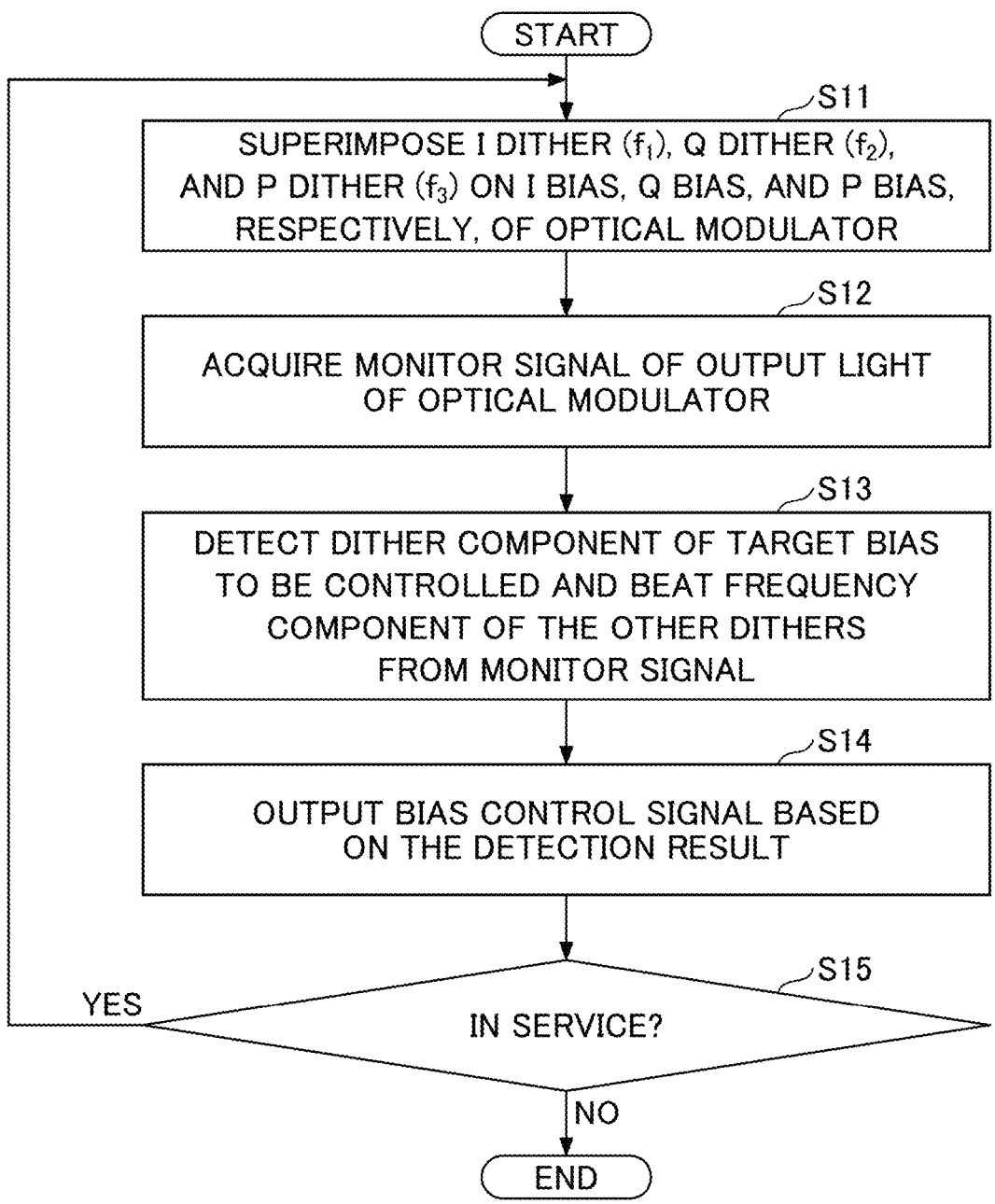
FIG. 10 is a flowchart of a control method of an optical modulator according to an embodiment.

FIG. 10 is a flowchart of a control method for the optical modulator 10 according to an embodiment. As has been described in connection with FIG. 4, the optical modulator 10 includes a child MZM 111 that generates a first optical signal using the first light beam split from the input light, a child MZM 112 that generates a second optical signal using the second light beam split from the input light, and a parent MZM 113 that generates a third optical signal from the first optical signal and the second optical signal. The control flow is carried out by the bias controller 20.

The bias controller 20 superimposes I dither (frequency f1), Q dither (frequency f2), and P dither (frequency f3) on I bias, Q bias, and P bias, respectively (S11). The I bias on which the I dither of the first frequency (f1) is superimposed is applied to the child MZM 111. The Q bias on which the Q dither of the second frequency (f2) is superimposed is applied to the child MZM 112. The P bias on which the P dither of the third frequency (f3) is superimposed is applied to the phase shifter 103 of the parent MZM 113.

The bias controller 20 acquires a monitor signal monitoring the output optical power of the optical modulator 10 (S12). The monitor signal represents, for example, a digital sampling result of the optical power monitor observed by extracting a portion of the output light of the optical modulator 10. The monitor light may actually be extracted from the output light by an optical splitter provided outside the optical modulator 10. Alternatively, radiation leaking from the Y coupler of the parent MZM 113 may be used as the monitor light. Several types of optical modulators have a function of receiving radiation leaking from the Y coupler of the parent MZM at a photodetector and generating a monitor signal. The bias controller 20 may make use of this function. The bias controller 20 detects a dither component (i.e., a first error component) having a frequency the same as the dither signal superimposed on the target bias to be controlled, and a beat frequency component (i.e., a second error component) of the dithers superimposed on the biases other than the target bias, from the monitor signal (S13). For this detection, either one of the dither component of the target bias or the beat frequency component may be multiplied by a coefficient to bring the spectral intensities to be consistent each other, as described with reference to FIG. 5.

The bias controller 20 outputs an error signal, that is, a bias control signal for tuning the voltage level of the target bias, based on the detected dither component and beat frequency component (S14). With this process, the bias of the optical modulator 10 can converge to the optimum point. The optimum bias level may be searched for by a loop control scheme for changing the bias while detecting the first error component and the second error component from the monitor signal. Steps S11 to S14 are repeatedly performed at regular time intervals during the operation of the optical modulator 10. If the optical modulator 10 is in service (YES in S15), the bias controller 20 returns to step S11 and repeats S11 to S14. As a result, the bias of the optical modulator 10 can be maintained in the optimum state in spite of DC drift. If the optical modulator 10 is not in service (NO in S15), the control process terminates.

I-bias control and Q-bias control may be performed in a time-division manner, or alternatively, individual bias control circuits for I-bias control and Q-bias control may be provided separately. Under time division control, the first circuit 201 of the bias control circuit 21 may serve as the third circuit for detecting a Q dither component (i.e., a third error component), and the second circuit 202 may serve as the fourth circuit for detecting the beat frequency component (i.e., the fourth error component) of the I dither and the P dither, during the period of Q bias control. The adder 217 may serve as a second adder that generates a second error signal for controlling the Q bias from the third error component and the fourth error component. The coefficient multiplier 213 may be provided in at least one of the third circuit and the fourth circuit, and it may serve as a second coefficient multiplier for multiplying the second coefficient. With this configuration, the Q bias of the optical modulator 10 can converge to the optimum point.

[Verification of the Effect]

Figure 11:
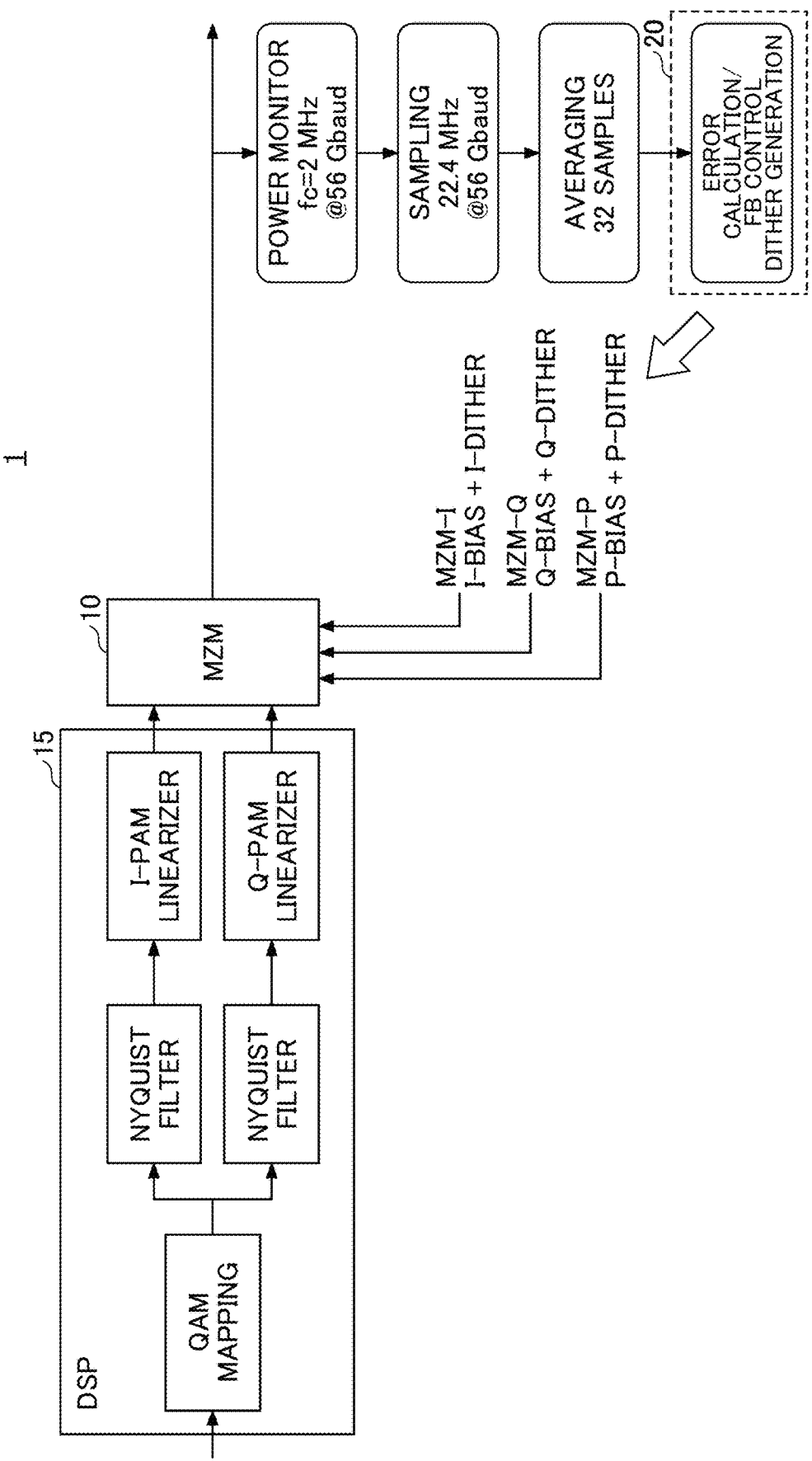
FIG. 11 is a diagram showing a simulation configuration for confirming the technical effect of the embodiment.

FIG. 11 is a simulation setup to verify the effect of the embodiment. A multi-level modulated signal generated by a digital signal processor (DSP) 15 is input to an optical modulator (denoted as "MZM" in the FIG. 10. Although, in the actual optical transmitter 1, a driver circuit that generates a radio frequency drive signal is arranged between the DSP 15 and the optical modulator 10, the driver circuit is omitted from the simulation setup diagram of FIG. 11.

QAM mapping performed in DSP 15 is a process of converting a pseudo-random binary sequence into an electric field signal including phase and amplitude, and mapping the phase and the amplitude to a constellation point on the IQ complex plane. After the QAM mapping, an I-arm signal and a Q-arm signal are band-limited by the associated Nyquist filters, respectively, and sinusoidal characteristics of the optical modulator are compensated for by the linearizers.

The roll-off rates of the Nyquist filters are set to 0.2, and the drive amplitude of the outermost symbol is set to $0.82 \times V\pi$, where $V\pi$ is a half-wavelength voltage required to drive the optical modulator 10. The half-wave voltage is a voltage that provides a phase difference of 180 degrees (i.e., $\pi$ radians) between light beams travelling through the two arms of, for example, the child MZM 111 (or the child MZM 112) when the voltage is applied between the two arms.

The power of the output light of the optical modulator 10 is monitored at a symbol rate of optical 56 Gigabaud and 2 MHz clock frequency. Monitor light is sampled at a sampling rate of 22.4 MHz and digitized. For the simulation, a photodetector for generating a current signal from the monitor light is omitted in this simulation setup diagram. In this setup diagram, the monitor light is processed into a monitor signal. The digitized monitor signal is averaged at every 32 samples, and a noise-removed signal is input to the bias controller 20.

The bias controller 20 performs hybrid bias control in which the first harmonic control scheme using dither superimposed on the target bias to be controlled and the beat frequency control scheme are combined, as has been described above. The dither signals applied to the respective biases are generated and an error is calculated from the digital monitor signal. The bias to be applied to the optical modulator 10 is feedback-controlled based on the result of the error calculation.

FIG. 12 is a simulation result performed with the simulation configuration of FIG. 11. FIG. 12A is a simulation result of the bias control of the hybrid method of the embodiment. As a comparison, FIG. 12(b) shows the simulation result when the bias is controlled only by the primary harmonic method, and FIG. 12(c) shows the simulation result when the bias is controlled only by the beat method.

Simulation was performed using three types of modulation, namely, quadrature phase shift keying (QPSK), 16QAM, and 64QAM, using the bias control schemes (a), (b), and (c) of FIG. 12. The extinction ratios of the I-arm child MZM and the Q-arm child MZM are both set to 25 dB. QAM constellations are observed after the bias control of the respective schemes. In the hybrid control (a) of the embodiment, the value of the coefficient "a" is set to 0.018 for QPSK, 0.04 for 16QAM, and 0.05 for 64QAM.

In the constellations under the first harmonic control scheme of FIG. 12(b), the constellation points (or the symbol points) shift toward the top left direction due to the influence of the intensity imbalance (already explained above). In the constellation under the beat frequency control scheme of FIG. 12(c), the constellation points shift toward the bottom right direction due to the influence of the intensity imbalance. On the other hand, in FIG. 12(a) where the hybrid bias control is applied, shifting or deviation of the constellation points is hardly observed. With the hybrid bias control of the embodiment, the deviation occurring in the first harmonic control scheme and the deviation occurring in the beat frequency control scheme cancel each other, and the bias can be adjusted to the optimum state without being affected by the intensity imbalance.

Figure 13A:
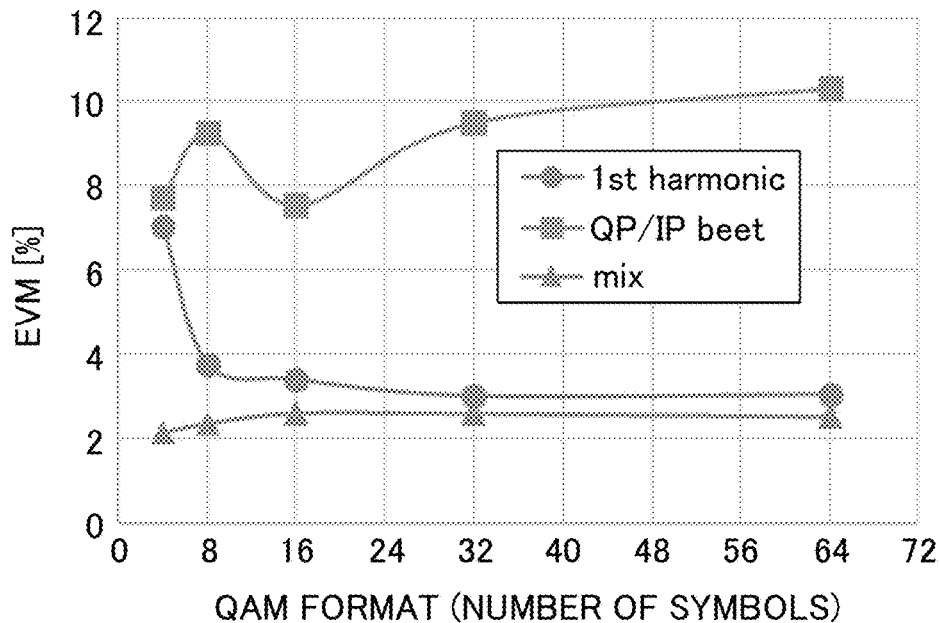
FIG. 13A is a diagram for quantitatively evaluating signal qualities of different bias control schemes based on error vector magnitude (EVM)
Figure 13B:
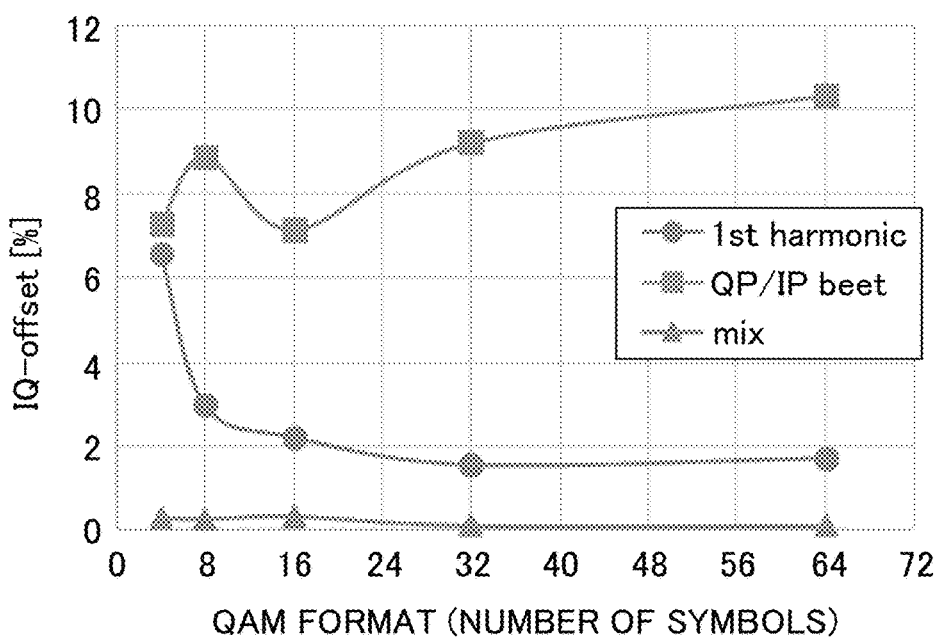
FIG. 13B is a diagram for quantitatively evaluating signal qualities of different bias control schemes based on IQ offset.

FIG. 13A and FIG. 13B show quantitative evaluation results of signal qualities acquired by the different bias control schemes. FIG. 13A shows error vector magnitude (EVM), and FIG. 13B shows IQ offset, both as a function of QAM format (the number of symbols).

The EVM plotted with dark circles is the bias control result of the first harmonic control scheme. The EVM plotted with the dark squares is the bias control result of the beat frequency control scheme. The EVM plotted by with dark triangles is the bias control result of the hybrid bias control scheme of the embodiment.

With reference to FIG. 13A, under the hybrid bias control of the embodiment, the EVM is stable and low even if the multi-level value (i.e., the number of symbols) changes. With the first harmonic control scheme, the EMV stabilizes as the degree of multi-level increases, but the EMV is high when the degree of multi-level is low (such as QPSK). It may be presumed that this is because the greater the average amplitude of the signal, the greater the deviation, and the less sensitive the dither detection is. The error detection sensitivity of the beat frequency control scheme is low, and the EVM is high regardless of the modulation schemes.

With reference to FIG. 13B, it is clearly understood that the IQ offset is greatly improved by adopting the hybrid bias control of the embodiment. The IQ offset represents the magnitude of the deviation of the constellation points (i.e., the symbol points).

Figure 14A:
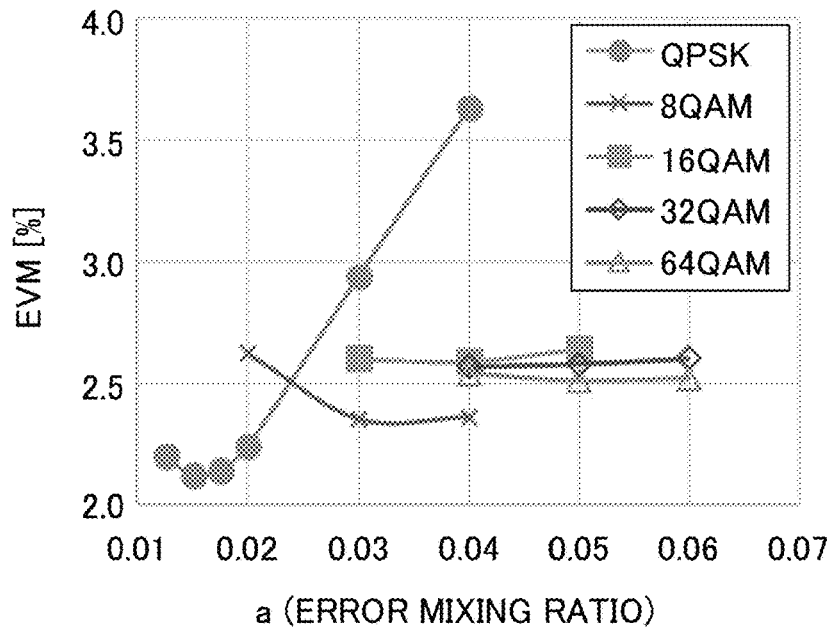
FIG. 14A is a diagram showing the stability of EVM when the modulation multi-level value is changed, which is a technical effect of the embodiment.
Figure 14B:
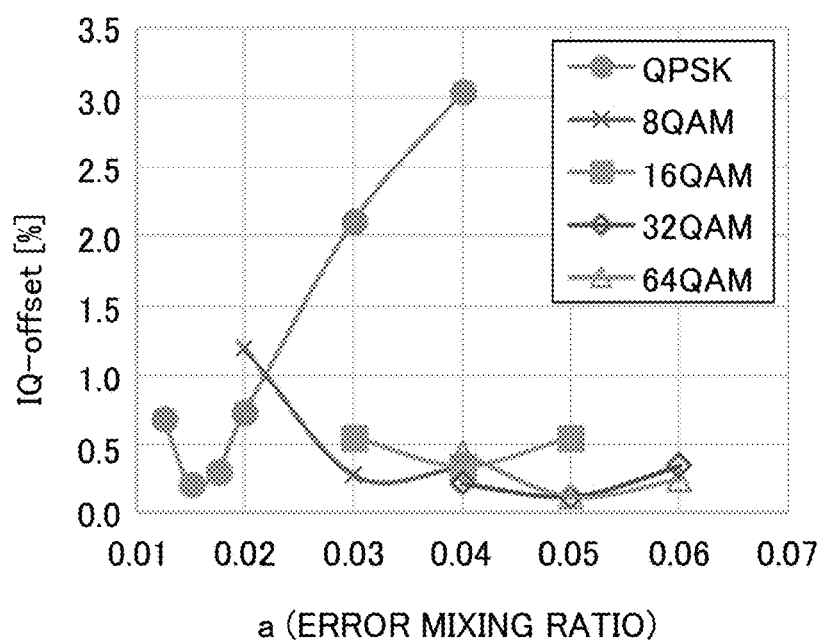
FIG. 14B is a diagram showing the stability of the IQ offset when the modulation multi-level value is changed, which is a technical effect of the embodiment.

FIG. 14A and FIG. 14B show the error mixture ratio (coefficient "a") dependence of signal qualities EVM and IQ offset, respectively. When the coefficient "a" is set to 0.04 in FIG. 14A and FIG. 14B, this value of the coefficient "a" can be used in common, regardless of the modulation scheme. In the case of QPSK, the EVM and the IQ offset are 3.5% and 3.0%, respectively, at a=0.04. It may appear that QPSK is inferior in quality compared with other modulation schemes; however, 3.5% is not serious for QPSK with a large symbol spacing. Besides, the value of the coefficient "a" may be reduced to a smaller value when QPSK is used.

By performing the hybrid bias control of the embodiment, the bias of the optical modulator 10 can be adjusted to the optimum state without being affected by the intensity imbalance between the I and Q arms, and the signal quality can be maintained.

Although the embodiments have been described based on the specific examples of configuration, the present disclosure is not limited to the above-described examples, and various modifications and substitutions are possible within the scope of the disclosure. Although the bias control has been described for the IQ modulation based optical modulator 10, the configuration and the process of the embodiments are applicable to dual-polarization (DP) QPSK based optical modulators. In such applications, the hybrid bias control may be performed for each of the parent MZMs dealing with the horizontally polarized wave component and the vertically polarized wave component. The ratio between the dither frequencies f1, f2, and f3 may be appropriately determined, other than the examples presented above, such that the dither frequencies do not overlap each other, that each frequency is not an integer multiple of the other frequencies, and that the dither frequency of the target bias does not overlap the beat frequency of the dithers for biases other than the target bias.

What is claimed is:

1. A method of controlling an optical modulator that includes a first child modulator configured to generate a first optical signal from a first light beam split from input light, a second child modulator configured to generate a second optical signal from a second light beam split from the input light, and a parent modulator configured to generate a third optical signal from the first optical signal and the second optical signal, the method comprising:
   superimposing a first dither signal having a first frequency on a first bias signal and applying the first bias containing the first dither signal to the first child modulator;
   superimposing a second dither signal having a second frequency different from the first frequency on a second bias signal and applying the second bias signal containing the second dither signal to the second child modulator;
   superimposing a third dither signal having a third frequency different from both the first frequency and the second frequency on a third bias signal and applying the third bias signal containing the third dither signal to the parent modulator;
   detecting a first error component having the first frequency, and a second error component having a beat frequency of the second frequency and the third frequency, from the third optical signal;
   generating a first error signal from the first error component and the second error component; and
   adjusting the first bias signal according to the first error signal.

2. The method as claimed in claim 1, further comprising:
   detecting a third error component having the second frequency, and a fourth error component having a beat frequency of the first frequency and the third frequency;
   generating a second error signal from the third error component and the fourth error component; and
   adjusting the second bias signal according to the second error signal.

3. The method as claimed in claim 1, further comprising:
   multiplying at least one of the first error component and the second error component by a coefficient that represents a mixing ratio between the first error component and the second error component.

4. The method as claimed in claim 2, further comprising:
   multiplying at least one of the third error component and the fourth error component by a coefficient that represents a mixing ratio between the third error component and the fourth error component.

5. The method as claimed in claim 2, further comprising:
multiplying at least one of the first error component and the second error component by a first coefficient that represents a mixing ratio between the first error component and the second error component; and
multiplying at least one of the third error component and the fourth error component by a second coefficient that represents a mixing ratio between the third error component and the fourth error component.

6. The method as claimed in claim 1,
wherein a ratio between the first frequency, the second frequency, and the third frequency is determined so that a beat frequency of the second frequency and the third frequency is different from the first frequency.

7. The method as claimed in claim 6,
wherein the ratio between the first frequency, the second frequency, and the third frequency is determined so that a beat frequency of the first frequency and the third frequency is different from the second frequency.

8. An optical transmitter comprising:
an optical modulator, in which a first child modulator and a second child modulator are connected in parallel to form a parent modulator; and
a bias controller that controls a first bias signal applied to the first child modulator and a second bias signal applied to the second child modulator,
wherein the bias controller includes
a waveform generating circuit configured to generate a first dither signal having a first frequency that is superimposed on the first bias signal, a second dither signal having a second frequency different from the first frequency that is superimposed on the second bias signal, and a third dither signal having a third frequency different from both the first frequency or the second frequency that is superimposed on the third bias signal applied to the parent modulator, and
a bias control circuit that includes a first circuit configured to detect a first error component of monitored optical power of an output light from the optical modulator having the first frequency, a second circuit configured to detect a second error component of monitored optical power of the output light having a beat frequency of the second frequency and the third frequency, and an adder configured to generate a first error signal for controlling the first bias signal based on the first error component and the second error component.

9. The optical transmitter as claimed in claim 8,
wherein the bias control circuit further includes
a third circuit configured to detect a third error component of monitored optical power of the output light having the second frequency,
a fourth circuit configured to detect a fourth error component of monitored optical power the output light having a beat frequency of the first frequency and the third frequency, and
a second adder configured to generate a second error signal for controlling the second bias signal based on the third error component and the fourth error component.

10. The optical transmitter as claimed in claim 9,
wherein at at least one of the first circuit and the second circuit has a coefficient multiplier configured to multiply a coefficient that represents the mixing ratio between the first error component and the second error component.

11. The optical transmitter as claimed in claim 9,
wherein at least one of the third circuit and the fourth circuit has a second coefficient multiplier configured to multiply a second coefficient that represents a mixing ratio between the third error component and the fourth error component.

12. The optical transmitter as claimed in claim 9,
wherein at least one of the first circuit and the second circuit has a coefficient multiplier configured to multiply a coefficient that represents a mixing ratio between the first error component and the second error component, and
at least one of the third circuit and the fourth circuit has a second coefficient multiplier configured to multiply a second coefficient that represents a mixing ratio between the third error component and the fourth error component.

13. The optical transmitter as claimed in claim 8,
wherein a ratio between the first frequency, the second frequency, and the third frequency is selected such that a beat frequency of the second frequency and the third frequency is different from the first frequency.

14. The optical transmitter as claimed in claim 13,
wherein the ratio between the first frequency, the second frequency, and the third frequency is set such that the second frequency and a beat frequency of the first frequency and the third frequency are different from each other.

* * * * *